(12) United States Patent
Kamiyama et al.

(10) Patent No.: US 7,846,021 B2
(45) Date of Patent: Dec. 7, 2010

(54) GAME APPARATUS, GAME ELEMENT GENERATION METHOD, PROGRAM AND RECORDING MEDIUM

(75) Inventors: Mitsuru Kamiyama, Tokyo (JP); Yasushi Matsumura, Tokyo (JP); Kazuhiro Yamauchi, Tokyo (JP); Shin Takenami, Tokyo (JP); Hiroyuki Kuwata, Tokyo (JP)

(73) Assignee: Kabushiki Kaisha Square Enix, Tokyo (JP)

(*) Notice: Subject to any disclaimer, the term of this patent is extended or adjusted under 35 U.S.C. 154(b) by 623 days.

(21) Appl. No.: 11/947,181

(22) Filed: Nov. 29, 2007

(65) Prior Publication Data

US 2008/0139308 A1    Jun. 12, 2008

(30) Foreign Application Priority Data

Dec. 8, 2006  (JP) ............................ P2006-332349

(51) Int. Cl.
*A63F 9/24*   (2006.01)
*A63F 13/00*  (2006.01)
*G09B 19/00*  (2006.01)

(52) U.S. Cl. ................... 463/31; 463/1; 463/9; 434/127
(58) Field of Classification Search ............ 463/1, 463/9–10, 30–33, 36–37, 47; 434/127, 281, 434/283, 298
See application file for complete search history.

(56) References Cited

U.S. PATENT DOCUMENTS 6,482,091 B1 *  11/2002 Kobayashi et al. ............ 463/36
7,507,154 B1 *  3/2009  D'Avanzo ..................... 463/16
2005/0075557 A1  4/2005  Kamiyama
2006/0046803 A1  3/2006  Suzuki

OTHER PUBLICATIONS

"Pocket Monsters Diamond & Pearl, Official Complete Guide", Media Factory, Inc., Oct. 27, 2006, pp. 233-235, accompanied by a brief explanation thereof.
U.S. Appl. No. 11/860,971 to Mamiyama et al, which was filed on Sep. 25, 2007.

* cited by examiner

*Primary Examiner*—Dmitry Suhol
*Assistant Examiner*—Robert Mosser
(74) *Attorney, Agent, or Firm*—Greenblum & Bernstein P.L.C.

(57) ABSTRACT

In a game capable of generating a game element which gives rise to predetermined benefits in the game by means of a player's operation, by preventing the player from quickly getting used to a generation operation of the game element, to stop the player from becoming bored with the operation.

On a magic stone generation screen, a solution 1202 being contained in a pot 1201, materials 1203 are floated in the solution 1202. An image of a material 1203, selected by a material selection operation, dissolving in the solution 1202 is displayed on the magic stone generation screen. When a stirring operation is carried out on the magic stone generation screen, in a condition in which the material 1203 is dissolved in the solution 1202, the solution 1202 and the material 1203 contained in the pot 1201 are churned by the operation. In the event that a speed at which the churning is carried out continues for six seconds within an optimum speed range 1205, a magic stone 1208 is generated. A kind of the generated magic stone 1208 is determined by a combination of kinds of the material 1203 dissolved in the solution 1202.

21 Claims, 6 Drawing Sheets

FIG. 3A 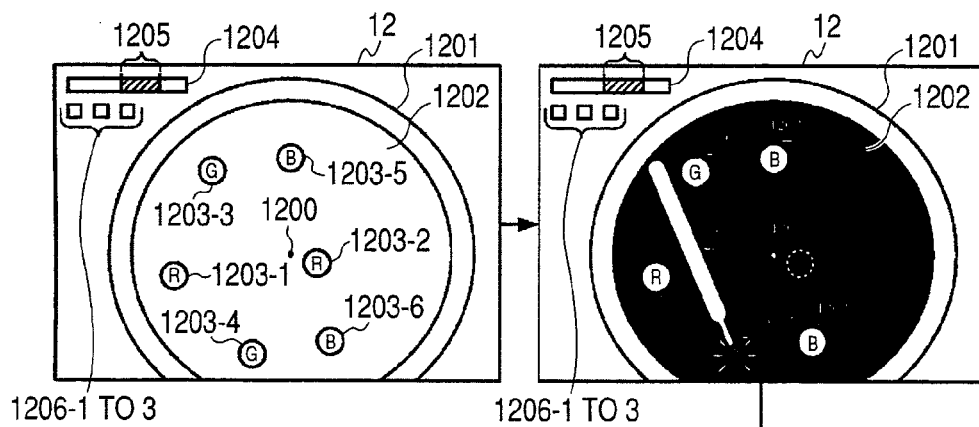 FIG. 3B
FIG. 3C 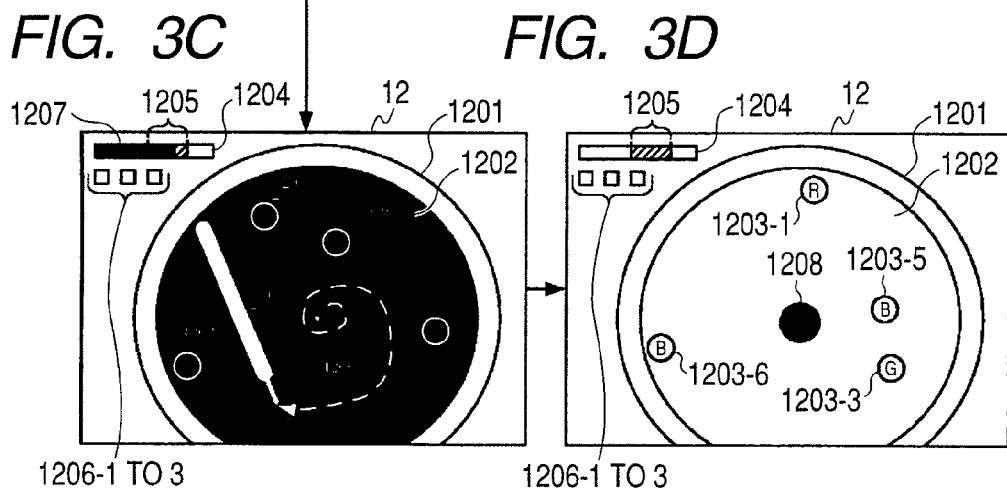 FIG. 3D

FIG. 5

| IMMEDIATELY PRECEDING CHURNING ANGLE | STIRRING ANGLE | IMMEDIATELY PRECEDING RADIUS | CURRENT RADIUS | CURRENT CHURNING ANGLE |
|---|---|---|---|---|
|  |  |  |  |  |
| ⋮ | ⋮ | ⋮ | ⋮ | ⋮ |
|  |  |  |  |  |

FIG. 6

| MAGIC STONE NAME | COMBINATION | | | |
|---|---|---|---|---|
| MAGIC STONE 1 | R | – | ⋯ | – |
| MAGIC STONE 2 | R | R | ⋯ | – |
| ⋮ | ⋮ | ⋮ | ⋮ | ⋮ |
| MAGIC STONE m | G | B | ⋯ | – |
| ⋮ | ⋮ | ⋮ | ⋮ | ⋮ |
| MAGIC STONE n | G | G | ⋯ | G |
| ⋮ | ⋮ | ⋮ | ⋮ | ⋮ |

FIG. 7

| KIND (COLOR) | POSITION | SELECTION FLAG |
|---|---|---|
| B |  |  |
| G |  |  |
| B |  |  |
| ⋮ | ⋮ | ⋮ |
| R |  |  |

GAME APPARATUS, GAME ELEMENT GENERATION METHOD, PROGRAM AND RECORDING MEDIUM

CROSS REFERENCE TO RELATED APPLICATION

The present disclosure relates to subject matter contained in Japanese Patent Application No. 2006-332349, filed on Dec. 8, 2006, the disclosure of which is expressly incorporated herein by reference in its entirety.

BACKGROUND OF THE INVENTION

1. Technical Field

The present invention relates to a game apparatus and the like which generate, in accordance with a player's churning operation, a game element which gives rise to predetermined benefits in a game.

2. Related Art

To date, there have been role playing games in which, by processing one item or compounding a plurality of items, a different, new item has been created. In many games, the creation of the new item by the processing or compounding of already existing items has been instructed just by means of a simple button operation. With this, a player cannot really appreciate that he or she is processing or compounding the items. As opposed to this, in the event that the item is created via a series of operational processes by the player, the player being able to appreciate that he or she has created the item him or herself, a gaming element increases.

Herein, there has been a case in which, by the player carrying out a stirring operation after selecting materials of an item to be newly created, from materials which the player has obtained in a process of a game, and inserting them in a pot, an item corresponding to a combination of kinds of the selected materials has been newly created (for example, refer to Non-Patent Document 1, "Pocket Monsters Diamond & Pearl, Official Complete Guide", Media Factory, Inc., Oct. 27, 2006, pages 233 to 235).

However, even though the new item is created using technology of Non-Patent Document 1, determinations of an operation which the player carries out (the stirring operation) to execute the creation have been ones carried out in accordance with an operation speed, being whether or not the stirring operation is being carried out slowly so as there is no spillage, or whether or not mixing is being done swiftly so as there is no burning. However, even though the new item is created any number of times in the game, there being no change in the stirring operation which the player carries out, the player quickly gets used to carrying out the stirring operation at an appropriate operation speed.

After getting used to the stirring operation at the appropriate operation speed in this way, as the player feels the stirring operation when creating the item to be simple, the player ceases to feel interest in the creation of the item. Given that it remains necessary to create the item in the same way, even after the player gets used to the stirring operation at the appropriate operation speed in this way, there has been a fear that having to go through a series of operation processes in order to create the item will seem extremely troublesome to the player.

SUMMARY OF THE INVENTION

An object of the invention is to provide a game apparatus and the like which, in a game capable of generating a game element which gives rise to predetermined benefits in the game by means of a player's operation, by preventing the player from quickly getting used to a generation operation of the game element, can stop the player from becoming bored with the operation.

In order to achieve the heretofore described object, a game apparatus according to a first aspect of the invention is a game apparatus which executes a game which uses a game element that causes a predetermined effect in the game during progress. The game apparatus includes a container display that displays an image of a container in which elemental materials that generate the game element are contained together with one of a liquid and a semi-liquid substance, the container being larger than the elemental materials. The game apparatus also includes a churning operation inputter that inputs, in accordance with a player's operation, a churning operation that churns the substance and the elemental materials contained in the container. The game apparatus further includes a churning display controller that determines a new aspect of the churning of the substance and the elemental materials in the container displayed on the container display in accordance with an aspect of the churning of the substance and the elemental materials until a present moment, and the churning operation input from the churning operation inputter, and displays the churning in a determined aspect. The game apparatus further includes a game element generator that generates the game element based on the churned elemental materials in accordance with the aspect of the churning of the substance and the elemental materials being displayed churning by the churning display controller.

In the game apparatus according to the heretofore described first aspect, the game element causes the predetermined effect in the game is generated, in accordance with the aspect of the churning of the substance and the elemental materials displayed on the container display in accordance with the churning operation input from the churning operation inputter, based on the churned elemental materials. The substance and the elemental materials are churned in accordance with the player's operation, and the game element is generated in accordance with the aspect of the churning of the substance and the elemental materials. By this means, the player can appreciate that his or her own operation results in the generation of the game element.

Also, the game element is generated in accordance not with the aspect of the churning operation input from the churning operation inputter, but with the aspect of the churning of the substance and the elemental materials. Herein, the aspect of the churning of the substance and the elemental materials is not decided simply by the aspect of the churning operation resulting from the player's operation, but is also decided in accordance with the aspect of the churning of the substance and the elemental materials until the present moment. That is, in the event that the aspect of the churning of the substance and the elemental materials until the present moment differs, even though the aspect of the input churning operation is the same, the newly determined aspect of the churning is different. For this reason, even in the event that the player carries out the generation of the game element in the game any number of times, it does not happen that an adjusting of the aspect of the churning of the substance and the elemental materials to the player's desired aspect becomes too easy. For this reason, it is possible to prevent the player from becoming quickly bored with the generation operation of the game element, and furthermore, to prevent the generation operation of the game element from seeming troublesome.

In the game apparatus according to the heretofore described first aspect, it is possible to arrange in such a way that, in the event that the input of the churning operation from the churning operation inputter is terminated after the substance and the elemental materials are displayed churning in the container, the churning display controller causes a continuation of the display of the churning, in accordance with the aspect of the churning displayed up to the present moment, while gradually reducing a speed at which the substance and the elemental materials are churned.

Herein, it is also acceptable to arrange in such a way that the churning operation inputter, in addition to terminating the input of the churning operation in the container, being able to input a condition in which the churning operation is stopped while the substance and the elemental materials are still in the container, in the event that the condition in which the churning operation is stopped while the substance and the elemental materials are still in the container has been input by means of the churning operation inputter, the churning display controller reduces the speed at which the substance and the elemental materials are churned further than in the case in which the input of the churning operation in the container is terminated.

In this case, after the player has carried out the operation for churning the substance and the elemental materials, the churning continues while gradually reducing speed in the event that the operation is terminated, while in the event that the operation is stopped in the container, the churning reduces speed further than in the event that the operation is terminated. Herein, the churning at the time of terminating the operation and the time of stopping the operation is displayed simulated on the container display in the same way as in real space. For this reason, it does not happen that the player feels an anomaly between his or her own operation and the churning of the substance and the elemental materials displayed simulated on the container display.

Furthermore, herein, it is possible to arrange in such a way that, in the event that, after the substance and the elemental materials are displayed being churned in the container, a churning operation in a direction opposite to a direction of the churning is newly input from the churning operation inputter, the churning display controller, after continuing the display of the churning in the same direction until the churning is stopped, while reducing the speed at which the substance and the elemental materials are churned further than in the case in which the input of the churning operation in the container is terminated, causes the substance and the elemental materials to be displayed churning in the direction of the churning operation newly input from the churning operation inputter.

In this case, in the event that the player, after carrying out the operation for churning the substance and the elemental materials in either direction, carries out the operation for churning in a direction opposite to the direction, the churning, after continuing in the same direction until it stops, while reducing the speed further than in the case in which the operation is terminated, is carried out in the input direction. Herein, the churning at the time of operating in the opposite direction is displayed simulated on the container display in the same way as in real space. For this reason, it does not happen that the player feels an anomaly between his or her own operation and the churning of the substance and the elemental materials displayed simulated on the container display device.

In the game apparatus according to the heretofore described first aspect, it is possible to arrange in such a way that, an optional quantity of one or more of the elemental materials being contained in the container, even in the event that the churning operation input from the churning operation inputter is the same, the larger the quantity of the elemental materials contained in the container, the slower the speed at which the churning display controller causes the substance and the elemental materials to be displayed churning.

In this case, in the event that the player carries out the operation for churning the substance and the elemental materials, the churning is carried out at a speed according to the quantity of the elemental materials contained in the container. Herein, a churning in which resistance is greater the larger the quantity of the elemental materials contained in the container is displayed simulated on the container display in the same way as in real space. For this reason, it does not happen that the player feels an anomaly between his or her own operation and the churning of the substance and the elemental materials displayed simulated on the container display device. Also, as it is necessary, in order to churn the substance and the elemental materials in the player's desired aspect, to adjust the input of the churning operation in accordance with the quantity of the elemental materials contained in the container too, it becomes increasingly unlikely that the player will quickly get used to the game element generation operation.

In the game apparatus according to the heretofore described first aspect, it is also acceptable that the churning display controller causes the substance and the elemental materials to be displayed churning in the container displayed on the container display, in a predetermined initial aspect which is not in a stopped condition, before there is the input of the churning operation from the churning operation inputter. In this case, it is possible to arrange in such a way that the game element generation device, under a condition that the churning of the substance and the elemental materials is not stopped from the predetermined initial aspect, generates the game element, and that the game apparatus further includes an initial aspect changer which, every time an opportunity to generate the game element arises, causes the predetermined initial aspect to change.

In this case, the substance and the elemental materials being displayed churning from an outset, the initial aspect of the churning differs every time a game aspect generation opportunity occurs. Also, in the event that the churning is once stopped from the initial aspect, it becomes impossible to generate the game element. In this way, as it is necessary, in order to churn the substance and the elemental materials in the player's desired aspect, to adjust while watching the aspect of the churning, it becomes increasingly unlikely that the player will quickly get used to the game element generation operation.

In the game apparatus according to the heretofore described first aspect, it is possible to arrange in such a way that the game element generation device, under a condition that the churning of the substance and the elemental materials, being displayed churning by the churning display controller, continues for a certain time within a predetermined speed range, generates the game element.

In this case, the game element which causes the predetermined effect in the game is generated when the churning continues for the certain time within the predetermined speed range. Herein, a more intricate operation is required of the player in his or her operation for the churning operation. By this means, it is possible to prevent the player from quickly getting used to the input operation of the churning operation. Furthermore, it is also possible to arrange in such a way that a limit is set on a time taken until the churning continues for the certain time within the predetermined speed range and, by means of this, it is possible to increase a degree of difficulty of generating the game element, and further prevent the player from getting used to the game element generation operation.

Herein, it is also acceptable to arrange in such a way that the heretofore described game apparatus further includes a churning speed display which displays whether the churning of the substance and the elemental materials, being displayed churning by the churning display controller, continues for the certain time within the predetermined speed range.

Furthermore, it is also acceptable to arrange in such a way that the churning speed display displays an actual speed of the churning of the substance and the elemental materials, being displayed churning by the churning display controller.

In this case, the player can confirm, by means of the churning speed display device, whether the speed at which the churning is being carried out is within the predetermined speed range. Also, in the event that the actual speed of the churning is displayed on the churning speed display, the player can adjust the operation for the churning, which he or she carries out him or herself, with this as a guideline.

Herein, it is also acceptable to arrange in such a way that the game element generator generates the game element in accordance with a direction of the churning until the churning of the substance and the elemental materials, being displayed churning by the churning display controller, continues for the certain time within the predetermined speed range.

In this case, the game element which gives rise to the predetermined benefits in the game is generated in accordance with the direction of the churning when the churning continues for the certain time within the predetermined speed range. By this means, there is an increase for the player in options for the generation of the game element. Herein, although an existence or otherwise of the generation of the game element is decided in accordance with the direction of the churning when the churning continues for the certain time within the predetermined speed range, it is also acceptable that kinds of the generated game element differ.

Furthermore, herein, it is also acceptable to arrange in such a way that the heretofore described game apparatus further include a speed range changer which changes the predetermined speed range.

By this means, as the player operation necessary for the player to generate the game element changes, making it possible to make the input operation of the churning operation one of a higher degree of difficulty, it is possible to prevent the player from quickly getting used to the operation. It is also acceptable that the speed range changer changes the predetermined speed range in accordance with an implementation condition of the game, such as a level of the player. Also, it is also acceptable that the speed range changer changes the predetermined speed range in accordance with the churned elemental materials.

In the game apparatus according to the heretofore described first aspect, it is possible to arrange in such a way that the game element generation device generates the game element in accordance with a speed of the churning of the substance and the elemental materials, being displayed churning by the churning display controller, from the inputting of the churning operation by means of the churning operation inputter being started until a predetermined time elapses.

In this case, as the speed of the churning in an entire period from the start of the inputting of the churning operation until the predetermined time elapses affects the generation of the game element, it is possible to make the input operation of the churning operation one of a higher degree of difficulty. Also, there is an increase in options for the generation of the game element for an advanced player who is particularly used to playing. Although the existence or otherwise of the generation of the game element is decided in accordance with the speed of the churning from the churning being started until the predetermined time elapses, it is also acceptable that the kinds of the generated game element differ.

In the game apparatus according to the heretofore described first aspect, it is possible to arrange in such a way that the game element generator generates the game element in accordance with a direction of the churning of the substance and the elemental materials, being displayed churning by the churning display controller, from the inputting of the churning operation by means of the churning operation inputting device being started until a predetermined time elapses.

In this case, as the direction of the churning in an entire period from the start of the inputting of the churning operation until the predetermined time elapses affects the generation of the game element, it is possible to make the input operation of the churning operation one of a higher degree of difficulty. Herein, although the existence or otherwise of the generation of the game element is decided in accordance with the direction of the churning from the churning being started until the predetermined time elapses, it is also acceptable that the kinds of the generated game element differ.

In the game apparatus according to the heretofore described first aspect, it is possible to arrange in such a way that a plurality of kinds of the elemental materials are provided, and a plurality thereof are contained in the container. Further, the game element generator generates the game element in accordance with a kind of one or more elemental material selected from among the plurality of the elemental materials contained in the container.

In this case, as the player can select the elemental materials in a variety of patterns, and generate differing kinds of the game element, it is possible to arrange in such a way that the player is even less likely to become bored with the generation of the game element. Herein, although the existence or otherwise of the generation of the game element is decided in accordance with the kind of the elemental material selected, it is also acceptable that the kinds of the generated game element differ.

In the game apparatus according to the heretofore described first aspect, it is possible to arrange in such a way that, even though the elemental materials are contained in the container, there being those in a condition in which they are dissolved in the substance, and those in a condition in which they are not dissolved. Further, the game element generator generates the game element based on the elemental materials, among the elemental materials contained in the container, in the condition in which they are dissolved in the substance.

Herein, it is also possible to arrange in such a way that, there being the plurality of kinds of the elemental material, and the container display displays the substance inside the container in varying display aspects, in accordance with kinds of the elemental materials contained in the container in the condition in which they are dissolved in the substance. Further the game element generator generates the game element in accordance with the kinds of the elemental materials contained in the container in the condition in which they are dissolved in the substance.

In this case, it is possible for the player to predict the elemental materials which are dissolved in the substance in accordance with the display aspect of the substance and furthermore, because of this, it is also possible to predict, to a certain extent, the game element generated in accordance with the dissolved elemental materials. Herein, although the existence or otherwise of the generation of the game element is decided in accordance with the condition of the dissolved elemental materials, it is also acceptable that the kinds of the generated game element differ. Also, herein, it is also acceptable to arrange in such a way that it is possible to dissolve the elemental materials in accordance with the player's operation.

In the game apparatus according to the heretofore described first aspect, it is possible to arrange in such a way that the churning operation inputter, being configured of a touch sensitive panel, disposed on a front surface of the container display, which transmissively indicates an image displayed on a relevant game image display, inputs the churning operation by means of tracing a position on the touch sensitive panel which corresponds to an inside of the container displayed by the container display.

In the game apparatus according to the heretofore described first aspect, it is possible to arrange in such a way that the churning operation inputter, being configured of a control pad including a multiaxial acceleration sensor, inputs the churning operation by causing a circular operation of the control pad.

By inputting the churning operation by means of these kinds of touch sensitive panel operation and control pad circular operation, the inputting of the churning operation can easily be carried out by an intuitive operation similar to a churning operation in a real life situation. Also, as the inputting of the churning operation can be carried out by the intuitive operation similar to the churning operation in the real life situation, as well as an operability increasing, it becomes a degree easier for the player to appreciate that he or she is carrying out the generation of the game element him or herself.

In the game apparatus according to the heretofore described first aspect, it is possible to arrange in such a way that the game apparatus further includes an elemental material obtainer that allows the player to obtain the elemental materials when predetermined events occur in the game. Further, the elemental materials obtained by the elemental material obtainer are displayed being, contained in the container on the container display in accordance with an instruction from the player.

In this case, there arising a necessity of obtaining the elemental materials in advance in order to generate the game element, as a limit is placed on opportunities for generating the game element, it is possible to arrange in such a way that, as far as possible, the player does not become used to the game element generation operation.

In order to achieve the heretofore described object, a game element generation method according to a second aspect of the invention is a game element generation method executed in a computer apparatus including a memory device which stores information, a display device which displays an image, and an inputting device capable of inputting by means of a circular operation. The method generates a game element which causes a predetermined effect by being used in a game. The method includes displaying an image of a container in a condition in which elemental materials for generating the game element are contained together with a liquid or semi-liquid substance, the container being larger than the elemental materials. The method further includes inputting, by the inputting device being subjected to the circular operation, a churning operation for churning the substance and the elemental materials contained in the container. The method further includes determining a new aspect of the churning of the substance and the elemental materials in the container displayed on the display device in accordance with an aspect of the churning of the substance and the elemental materials displayed on the display device until the present moment and the churning operation input by means of the circular operation of the inputting device, and temporarily storing the new status in the memory device. The method further includes displaying, on the display device, an image of the substance and the elemental materials churned in the container in the aspect temporarily stored in the memory device. The method further includes generating the game element based on the churned elemental materials in accordance with the aspect of the churning of the substance and the elemental materials being displayed on the display device, and storing the generated game element in the memory device.

In order to achieve the heretofore described object, a program according to a third aspect of the invention is a program of a game which is executed in a computer apparatus including a memory device which stores information, a display device which displays an image, and an inputting device capable of inputting by means of a circular operation. The game uses a game element which causes a predetermined effect in the game during progress. The program causes the computer apparatus to display an image of a container in a condition in which elemental materials for generating the game element are contained together with a liquid or semi-liquid substance, the container being larger than the elemental materials. The program further causes the computer apparatus to input, by means of the circular operation of the inputting device, a churning operation for churning the substance and the elemental materials contained in the container. The program further causes the computer apparatus to determine a new aspect of the churning of the substance and the elemental materials in the container displayed on the display device in accordance with an aspect of the churning of the substance and the elemental materials displayed on the display device until the present moment and the churning operation input by means of the circular operation of the inputting device, and to temporarily store the new aspect in the memory device. The program further causes the computer apparatus to display, on the display device, an image of the substance and the elemental materials churned in the container in the aspect temporarily stored in the memory device. The program further causes the computer apparatus to, in accordance with the aspect of the churning of the substance and the elemental materials being displayed on the display device, generating the game element based on the churned elemental materials, and to store the generated game element in the memory device.

The program according to the heretofore described third aspect can be provided recorded in a computer readable recording medium. It is also acceptable that the computer readable recording medium, being configured in such a way as to be attachable to and detachable from the computer apparatus, is a recording medium provided separately from the computer apparatus. It is also acceptable that the computer readable recording medium, being provided inside the computer apparatus, is a recording medium, such as a fixed disc device, provided together with the computer apparatus. The program according to the heretofore described third aspect can also be distributed to the computer apparatus from a server apparatus existing on a network, via the network, superimposing a data signal thereof on a carrier wave.

BRIEF DESCRIPTION OF THE DRAWINGS

FIGS. 3A to 3D are views showing specific examples of a magic stone generation screen displayed on a second LCD at a magic stone generation time, in an RPG according to the embodiment of the invention;

FIG. 5 is a diagram showing one example of a churning speed calculation table provided in an RAM of a cartridge, in the RPG according to the embodiment of the invention;

FIG. 6 is a diagram showing one example of a magic stone generation conditions table provided in an ROM of the cartridge, in the RPG according to the embodiment of the invention;

FIG. 7 is a diagram showing one example of an in-pot materials table provided in the RAM of the cartridge, in the RPG according to the embodiment of the invention;

DESCRIPTION OF THE PREFERRED EMBODIMENT(S)

Hereafter, a description will be given of an embodiment of the invention, referring to the attached drawings.

Figure 1:
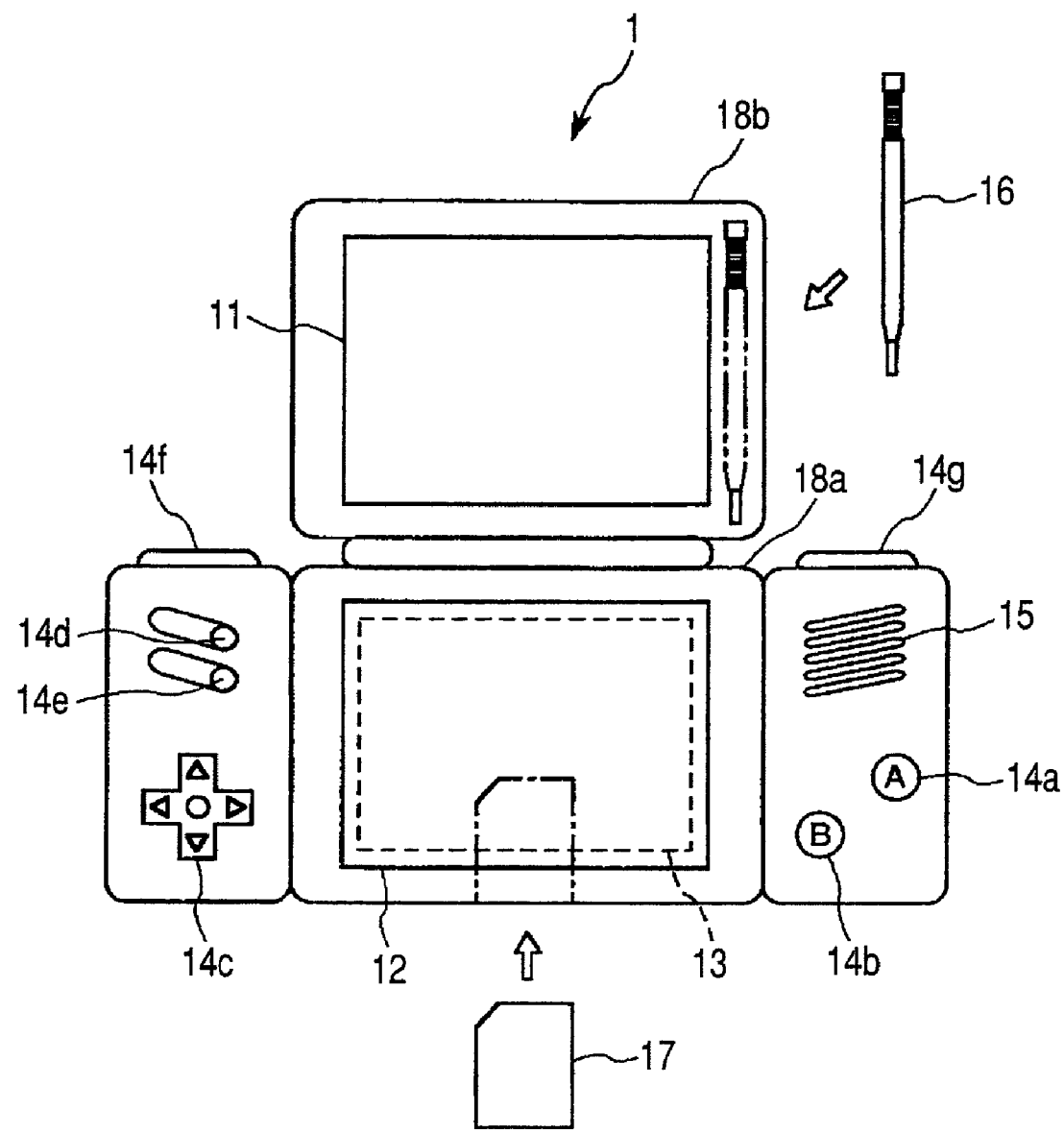
FIG. 1 is an external view showing a configuration of a game apparatus applied to an embodiment of the invention.

FIG. 1 is an outline view showing a configuration of a game apparatus 1 applied to the embodiment. Herein, a portable game device is shown as one example of the game apparatus 1. In FIG. 1, the game apparatus 1 is configured housing two liquid crystal displays (LCD's) 11 and 12 in a housing 18, in such a way that they are in predetermined disposition positions.

In a case in which a first liquid crystal display (hereafter referred to as an "LCD") 11 and a second LCD 12 are housed disposed one on top of the other, the housing 18 being configured of a lower housing 18a and an upper housing 18b, the upper housing 18b is supported in such a way as to be pivotable about one portion of a top edge of the lower housing 18a. In the upper housing 18b, which has a flat form slightly bigger than a flat form of the first LCD 11, an opening is formed in such a way as to expose a display screen of the first LCD 11 through one principal surface. In the lower housing 18a, a flat form of which is taken to be horizontally longer than the upper housing 18b, an opening which exposes a display screen of the second LCD 12 being formed in an approximately central portion of a horizontal direction, operating switch portions 14 which, as well as sound outlet apertures of a speaker 15 being formed on one of right and left sides sandwiching the second LCD 12, are mounted on the right and left sides.

The operating switch portions 14 include an operation switch (hereafter referred to as an "A button") 14a and an operation switch (hereafter referred to as a "B button") 14b, a direction indicating switch (hereafter referred to as a "cross key") 14c, a start switch 14d, a selection switch 14e, a side switch (hereafter referred to as an "L button") 14f and a side switch (hereafter referred to as an "R button") 14g.

The A button 14a and the B button 14b are mounted on one principal surface of the lower housing 18a, to a right side of the second LCD 12. The A button 14a and the B button 14b are used, for example, in a role playing game (hereafter referred to as an "RPG") applied in the embodiment, to input an instruction for a behavior of a player character.

The cross key 14c is mounted on one principal surface of the lower housing 18a, to a left side of the second LCD 12. The cross key 14c is used for a direction instruction on a game screen, such as instructing a movement direction of a player object (the player character in the embodiment), operable by a player using the operating switch portions 14, or instructing a movement direction of a cursor.

The L button 14f and the R button 14g are provided on a right and left of a top surface (a top side surface) of the lower housing 18a. In the embodiment, the L button 14f is used to input an instruction to change an image being displayed on the second LCD 12 to an image for generating a magic stone (hereafter referred to as a "magic stone generation image"), to be described hereafter, while the R button 14g is used to input an instruction for reversing the change by the L button 14f. Hereafter, a time when the magic stone generation image is displayed on the second LCD 12 by the instruction from the L button 14f will be called a "magic stone generation time", which is differentiated from a "normal time" when a command selection screen is displayed.

A touch sensitive panel 13 (an area delineated by a broken line in FIG. 1) is mounted on a top surface of the second LCD 12. The touch sensitive panel 13, which can be any kind among, for example, a resistive type, an optical type (an infrared type), or a capacitive coupling type, is one which, when a top surface thereof is depression operated, movement or stroke operated by a stick 16 (or, as is also possible, a finger), detects and transmits a coordinate position of the stick 16. In the RPG applied in the embodiment, the touch sensitive panel 13 is used, at the magic stone generation time, to input an instruction causing the generation of the magic stone.

A storage slot (an area delineated by a two-dot broken line area in FIG. 1) for storing the stick 16 which operates, when necessary, the touch panel 13 is formed in a vicinity of a side surface of the upper housing 18b. The stick 16 is stored in the storage slot. A cartridge insertion portion (an area delineated by a one-dot broken line in FIG. 1) for removably attaching a game cartridge (hereafter referred to as a "cartridge") 17, which contains a memory (for example, an ROM) in which a game program is stored, is formed in a portion of a side surface of the lower housing 18a. The cartridge 17 being an information storage medium which stores the game program, a non-volatile semiconductor such as, for example, an ROM or a flash memory, is used therefor. A connector for electrically connecting with the cartridge 17 (refer to FIG. 2) is built into an interior of the cartridge insertion portion. Furthermore, an electronic circuit substrate on which are mounted various electronic parts, such as a CPU, is housed in the lower housing 18a (or, as is also possible, in the upper housing 18b).

Figure 2:
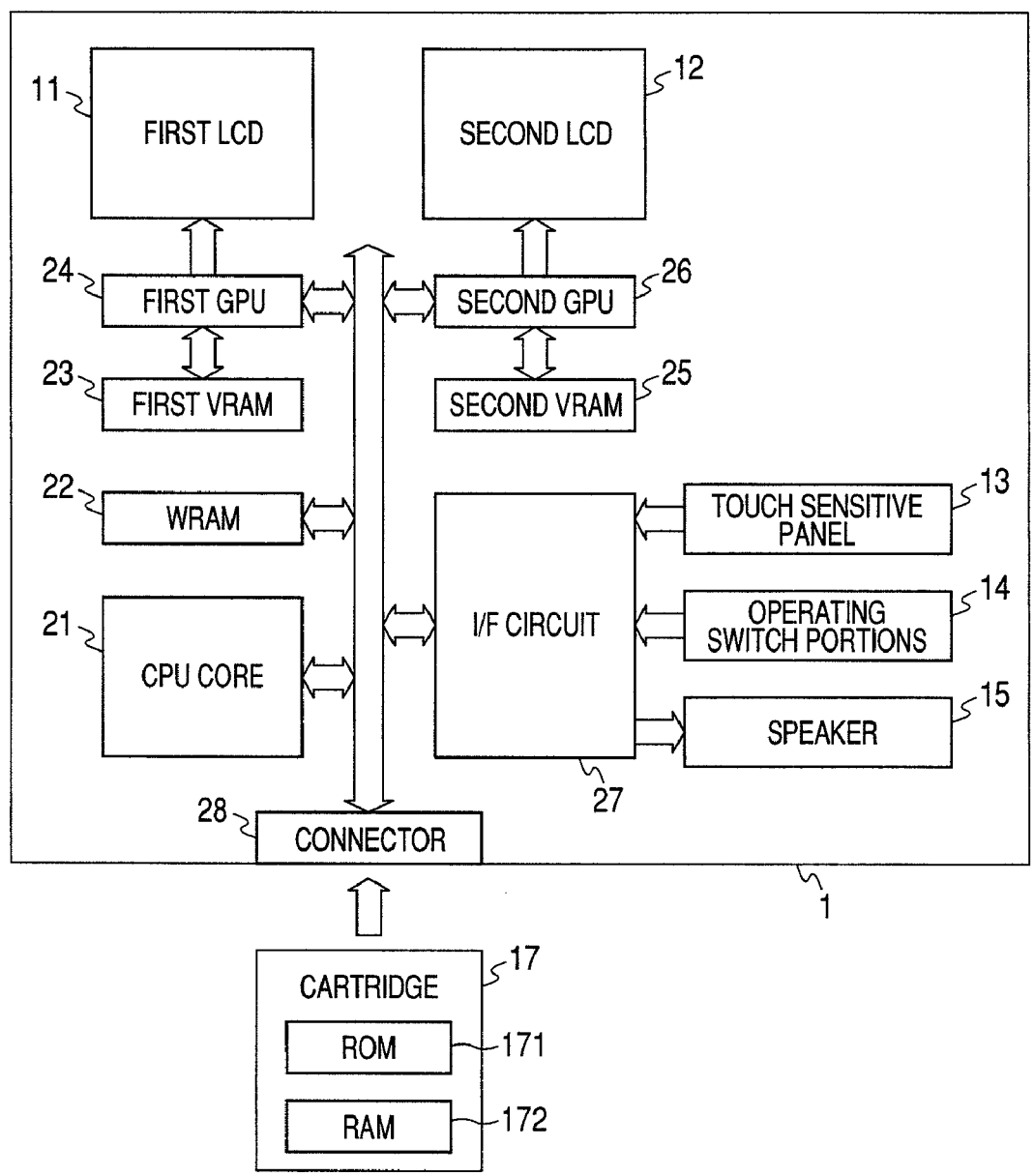
FIG. 2 is a block diagram showing a circuit configuration of the game apparatus applied to the embodiment of the invention.

Next, a description will be given of a circuit configuration of the game apparatus 1. FIG. 2 is a block diagram showing the circuit configuration of the game apparatus 1. In FIG. 2, a CPU core 21 is mounted on the electronic circuit substrate housed in the housing 18. As well as the connector 28 for connecting with the cartridge 17 being connected, an input-output interface (I/F) circuit 27, a first graphics processing unit (first GPU) 24, a second graphics processing unit (second GPU) 26, and a working RAM (WRAM) 22 are connected, via a predetermined bus, to the CPU core 21. The CPU core 21 has an internal timer.

The cartridge 17 is removably connected to the connector 28. The cartridge 17, being the storage medium for storing the game program, as heretofore described, specifically, is loaded with an ROM 171 which stores the game program, and an RAM 172, which rewritably stores backup data. The game program stored in the ROM 171 of the cartridge 17 is loaded into the WRAM 22, and the game program loaded into the WRAM 22 is executed by the CPU core 21. Data for generating temporary data and images obtained by the CPU core 21 executing the game program are stored in the WRAM 22. The game program, which is a group of orders and a group of data of formats which can be executed by a computer of the game apparatus 1, in particular by the CPU core 21, is stored in the ROM 171. Then, the game program is read as appropriate by the WRAM 22 and executed.

A first video RAM (hereafter referred to as a "first VRAM") 23 is connected to the first GPU 24, while a second video RAM (hereafter referred to as a "second VRAM") 25 is connected to the second GPU 26. The first GPU 24, in accordance with an instruction from the CPU core 21, generates a first game image based on the data for generating the images stored in the WRAM 22, and draws it in the first VRAM 23. The second GPU 26, in accordance with an instruction from the CPU core generates a second game image based on the data for 21, generating the images stored in the WRAM 22, and draws it in the second VRAM 25. One frame time of the images included in the data transmitted from the first GPU 24 and the second GPU 26 being, for example, one thirtieth of a second, the first GPU 24 and the second GPU 26, herein, draw one image in a frame unit (that is, a unit of one thirtieth of a second).

The first GPU 24 is connected to the first LCD 11, while the second GPU 26 is connected to the second LCD 12. The first GPU 24 transmits the first game image, drawn in the first VRAM 23 in accordance with the instruction from the CPU core 21, to the first LCD 11. Then, the first LCD 11 displays the first game image transmitted from the first GPU 24. The second GPU 26 transmits the second game image, drawn in the second VRAM 25 in accordance with the instruction from the CPU core 21, to the second LCD 12. Then, the second LCD 12 displays the second game image transmitted from the second GPU 26.

The touch sensitive panel 13, the operating switch portions 14, and the speaker 15 are connected to the I/F circuit 27. The I/F circuit 27 is a circuit which carries out a passing of data between the CPU core 21 and external input-output devices, such as the touch sensitive panel 13, the operating switch portions 14, and the speaker 15.

The touch sensitive panel 13 (including a device driver for the touch sensitive panel), having a coordinate system corresponding to a coordinate system of the second VRAM 25, transmits coordinate data corresponding to a position input (instructed) by the stick 16 or the like to a predetermined register provided in the WRAM 22. For example, a resolution of the display screen of the second LCD 12 being 256 dots× 192 dots, a detection accuracy of the touch sensitive panel 13 is also 256 dots×192 dots, corresponding to the display screen. It is also acceptable that the detection accuracy of the touch sensitive panel 13 is either lower or higher than the resolution of the display screen of the second LCD 12. The speaker 15, being disposed in a position inside the heretofore described sound outlet apertures, transmits a sound generated in accordance with a game being executed.

Next, a description will be given of each of the images displayed on the first LCD 11 and the second LCD 12 at the normal time and the magic stone generation time in the RPG applied in the embodiment. The game screen (generated by a perspective transformation of a hypothetical three-dimensional space) is displayed on the first LCD 11 at both the normal time and the magic stone generation time. On the game screen displayed on the first LCD 11 at the magic stone generation time, movement of the player character is stopped.

Although the command selection screen is displayed on the second LCD 12 at the normal time, a magic stone generation screen (an image of a pot seen from above) is displayed thereon at the magic stone generation time. On the magic stone generation screen displayed on the second LCD 12 at the magic stone generation time, a material selection operation, a stirring operation, and a magic stone removal operation, to be described hereafter, are received by means of inputs from via the touch sensitive panel 13, but a selection of a command is not received.

A player can switch a condition of a game between the normal time and the magic stone generation time by an operation of the L button 14*f* and the R button 14*g*. In the event that the L button 14*f* is operated at the normal time, a pot for generating a magic stone, to be described hereafter, appears on the game screen being displayed on the first LCD 11. When the L button 14*f* is operated in a condition in which the pot is positioned in a vicinity of a front of the player character on the game screen of the first LCD 11 at the normal time, the condition switches to the magic stone generation time. When the R button 14*g* is operated at the magic stone generation time, the condition switches to the normal time.

Hereafter, a description will be given of the game executed in the embodiment by the game apparatus 1 shown in FIGS. 1 and 2. The game according to the embodiment being the RPG, a field is formed in the hypothetical three-dimensional space, which is a player character movement space, and the player implements the game while moving the player character on the field by operating the operating switch portions 14 (the cross key 14*c*). The player can obtain and use various items during the implementation process of the game. The items including a variety of articles, the magic stone, for which predetermined advantages in the implementation of the game (for example, using in an attack on an enemy character, restoring a predetermined parameter of the player character, and the like) are set, and a material for generating the magic stone is also included in the items. The player, at the magic stone generation time, can generate the magic stone using the material, to be described hereafter.

The material can be obtained, during the implementation process of the game, by winning a battle against the enemy character, purchasing at a shop in the hypothetical three-dimensional space, or being positioned at a predetermined point in the hypothetical three-dimensional space. A plurality of the materials being prepared, each kind of material is indicated by one of three kinds of color, red (R), green (G) or blue (B). When displayed on the magic stone generation screen of the second LCD 12, each material is indicated by a kind of color. The three kinds being not only simply different in a display color, in the event that they are used in the generation of the magic stone, kinds of the magic stone generated differ.

Next, a specific description will be given of a flow as far as the generation of the magic stone from the materials, at the magic stone generation time, while referring to an example of the magic stone generation screen displayed on the second LCD 12. FIGS. 3A to 3D are views showing specific examples of the magic stone generation screen displayed on the second LCD 12 at the magic stone generation time.

As shown in FIGS. 3A to 3D, a circular pot 1201 of a predetermined size, of which a center point 1200 is positioned in an approximate center of the screen, a churning speedometer 1204 indicating a speed at which churning is being carried out, an optimum speed range 1205 indicating an optimum range of the churning speed, and three optimum lamps 1206-1 to 1206-3 are included on the magic stone generation screen. A liquid or semi-liquid substance (hereafter referred to as a "solution") 1202 being contained in the pot 1201, materials 1203 are floating in the solution 1202. In the condition in which they are floating in the solution 1202, the materials 1203 are all displayed at the same size.

The churning speedometer 1204 indicates a degree of the speed at which the churning is being carried out by means of a bar. In the churning speedometer 1204, the farther the bar is to the left, the lower the churning speed, and the farther the bar is to the right, the higher the churning speed. The optimum lamps 1206 are lamps which are illuminated in the event that the speed at which the churning is being carried out is within the optimum speed range 1205 for a certain period (for example, two seconds).

FIG. 3A is an initial condition immediately after the magic stone generation screen is caused to be displayed on the second LCD 12 by the operation of the L button 14f. A color of the solution 1202 changes in accordance with an RGB value of pixels farther to an interior than the pot 1201. For example, in a case in which the RGB value for each pixel adopts a value in a range of 0 to 15 for each of R, G and B, it is taken that (R,G,B)=(15,15,15) indicates white, while (R,G,B)=(0,0,0) indicates black.

In a condition in which the materials 1203 are still not dissolved, the RGB value of the solution 1202 contained in the pot 1201 being (R,G,B)=(15,15,15), the color of the solution 1202 is displayed as white on the magic stone generation screen. In FIG. 3A, a total of six materials 1203; red (R) materials 1203-1 and 1203-2, green (G) materials 1203-3 and 1203-4, and blue (B) materials 1203-5 and 1203-6 are floating in the solution 1202.

When a position on the touch sensitive panel 13 corresponding to a position of a material 1203 displayed on the magic stone generation screen of the second LCD 12 is touched by means of a depression operation, an image of a material 1203 selected by means of the material selection operation dissolving in the solution 1202 is displayed. Hereafter, an operation of dissolving the material 1203 in the solution 1202 by touching the touch sensitive panel 13 is called the material selection operation. In the event that a material 1203 is selected by the material selection operation, the RGB values of colors other than that of the material 1203 are reduced by five each in the RGB value of the solution 1202, and the color of the solution 1202 changes in accordance with the color of the dissolved material 1203.

In the event that the material selection operation is carried out on the red (R) material 1203-2 in FIG. 3A, a display aspect changes, as shown in FIG. 3B. Although, in order to make it easily understandable, the material 1203-2 selected by means of the material selection operation is displayed in FIG. 3B by a broken line, it is not displayed on the display screen. The RGB value of the solution 1202 in FIG. 3B being (R,G,B)=(15,10,10), the color of the solution 1202 is displayed as a color darker than that before the selection of the material, and with a reddish hue.

In FIG. 3B, in the event that the green (G) material 1203-4 is newly selected by means of the material selection operation, an image of the selected material 1203-4 dissolving in the solution 1202 is displayed. Herein, the RGB value of the solution 1202 changing from (R,G,B)=(15,10,10) to (R,G,B)=(10,10,5), the color of the solution 1202 changes to a color darker than that before the selection of the material, and with reddish and greenish hues.

When a position on the touch sensitive panel 13 corresponding to a position in the solution 1202 displayed on the magic stone generation screen of the second LCD 12 is continuously touched by a movement operation which moves around the position, an image is displayed of the solution 1202 contained in the pot 1201 and the materials 1203 in the solution 1202 churning due to the stirring operation. Hereafter, an operation of causing the solution 1202 to churn by the touch sensitive panel 13 being touched with an orbiting movement is referred to as the stirring operation.

In FIG. 3B, in the event that the stirring operation is carried out in a clockwise direction on the solution 1202, a display aspect changes as shown in FIG. 3C. In FIG. 3C, the solution 1202 and the materials 1203 floating in the solution 1202 are churned, centered on the center point 1200, at a churning speed and in a churning direction calculated by a method to be described hereafter. The speed of the churning being carried out in FIG. 3C is displayed on the churning speedometer 1204 by a bar 1207. Every time the bar 1207 is continuously within the optimum speed range 1205 for two seconds, the three optimum lamps 1206-1 to 1206-3 are illuminated sequentially, one by one, from a left optimum lamp 1206-1 to the right.

In the event that the three optimum lamps 1206-1 to 1206-3 are illuminated due to the stirring operation in FIG. 3C, a magic stone 1208 is generated, and a display aspect changes as shown in FIG. 3D. In FIG. 3D, the magic stone 1208 is displayed in an approximate center of the pot 1201, and all the optimum lamps 1206 are extinguished due to the magic stone 1208 being generated. Also, due to the magic stone 1208 being generated, the RGB value of the solution 1202 returns in accordance with the materials 1203 used as ingredients of the magic stone 1208. In the event that the materials 1203 are not selected by the material selection operation, the magic stone 1208 is not generated, even in the event that the stirring operation is carried out.

When the stirring operation is carried out in a condition in which the magic stone 1208 is contained in the pot 1201, the magic stone 1208, in the same way as the materials 1203, floats in the solution 1202 and is churned. When a position on the touch sensitive panel 13 corresponding to a position of the magic stone 1208 displayed on the magic stone generation screen of the second LCD 12 is touched by means of the depression operation, an image is displayed of the magic stone 1208 selected by the magic stone removal operation flying out of the pot 1201 (a display range of the second LCD 12). Hereafter, an operation of removing the magic stone 1208 from the pot 1201 by means of touching the touch sensitive panel 13 is referred to as the magic stone removal operation. The magic stone 1208 which flies from the pot 1201 (the display range of the second LCD 12), due to the magic stone removal operation, is displayed within a range of the game screen. The player character can obtain the magic stone which is displayed on the game screen.

Figure 4:
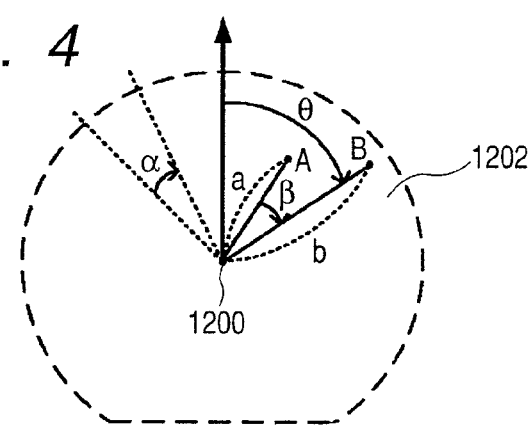
FIG. 4 is a diagram schematically showing a calculation method of a stirring speed and direction, in the RPG according to the embodiment of the invention.

Next, a description will be given of a method of calculating the speed and determining the direction of the churning. The churning speed and direction being respectively calculated or determined in accordance with a speed at which, and direction in which, the churning is currently being carried out, and with an angular speed, a radius and a direction (hereafter referred to respectively as a "stirring speed", a "stirring radius" and a "stirring direction") at which the stirring operation is being carried out, when calculating the speed and determining the direction of the churning, the stirring speed, the stirring radius and the stirring direction are calculated first. FIG. 4 schematically shows a method of calculating the stirring speed, the stirring radius and the stirring direction.

As shown in FIG. 4, a coordinate system (hereafter referred to as a pot coordinate system) is set, in a plane on the second LCD 12, with the center point 1200 of the pot 1201 as an origin, expressed in accordance with a distance from the origin (that is, a radius from the center point 1200) and an angle which a direction from the origin forms with a reference direction (herein, an upward direction). Naturally, an angle formed with the reference direction not being a problem in the calculation of the stirring speed and the stirring direction, an angle change in one frame period is taken as the problem.

For example, it is taken that a position of point A has been touched in an immediately preceding frame period, and a position of point B is touched in a current frame period. The stirring speed being expressed by a rotation angle β from point A to point B, the stirring direction, being a rotation direction from point A to point B, is a clockwise direction in the event that the rotation angle β is positive, and a counter-clockwise direction in the event that the rotation angle β is negative. It being possible to express the stirring speed and direction by the angle change, they are expressed by the stirring angle β (indicating a negative value with the counter-clockwise direction). Also, a rotation radius in the immediately preceding frame period (a distance a from the center point 1200 to the position of point A (hereafter referred to as an "immediately preceding radius a")), and a rotation radius in the current frame period (a distance b from the center point 1200 to the position of point B (hereafter referred to as a "current radius b")), are also calculated.

The stirring angle β, the immediately preceding radius a, and the current radius b are calculated from the center point 1200 in an X-Y coordinate system set on the touch sensitive panel 13, a position touched on the touch sensitive panel 13 in the immediately preceding frame period, and a position touched on the touch sensitive panel 13 in the current frame period. Also, in the event that the touch sensitive panel 13 has not been touched in the immediately preceding and/or current frame period, it is determined that the stirring operation has not been carried out. It being impossible, with a normal human operation, to remove a pen from the touch sensitive panel 13 then touch it again in a time shorter than one frame, as it is also possible, with the immediately preceding radius a and the current radius b, to approximate a radius of an interim route, an operation history of the touch sensitive panel 13 between the immediately preceding frame period and the current frame period is not considered to be a problem.

The churning speed also being expressed as a rotation angle, the churning direction is also expressed as positive or negative depending on whether it is a clockwise direction or a counter-clockwise direction. The churning speed and direction are expressed as a churning angle α (indicating a negative value with the counter-clockwise direction). In particular, a churning speed and direction calculated (currently being carried out) in the immediately preceding frame period are expressed as an immediately preceding churning angle α, and a churning speed and direction calculated in the current frame period are expressed as a current churning angle α.

The churning speed and direction in the current frame period (the current churning angle α) are determined by referring to a churning speed calculation table calculated in advance by simulating the stirring operation. One example of the churning speed calculation table provided in the ROM 171 of the cartridge 17 is shown in FIG. 5.

As shown in FIG. 5, an immediately preceding churning angle 101, a stirring angle 102, an immediately preceding radius 103, a current radius 104, and a current churning angle 105 are registered, correlated, in a churning speed calculation table 100. Also, a limit value being set for the stirring angle 102 too, a maximum value is used in the event that the stirring angle 102 exceeds the limit value, but it hardly ever happens, with an operation carried out by a normal human, that the stirring angle β calculated in the way heretofore described exceeds the limit value of the stirring angle 102 registered in the table of FIG. 5. Also, although there are also data in which the stirring angle 102, the immediately preceding radius 103, and/or the current radius 104 are not registered, these data are used in the event that it is determined that the stirring operation has not been carried out.

In the churning speed calculation table 100, in the event that, the stirring angle 102 being a value other than zero, a positivity or negativity of the stirring angle 102 and the immediately preceding churning angle 101 are the same (in the event that the stirring direction and a current churning direction are the same), the current churning angle 105 is registered in such a way that the churning speed of the solution 1202 increases. In the event that the stirring angle 102 is a value other than zero, but the positivity or negativity of the stirring angle 102 and the immediately preceding churning angle 101 do not coincide (in the event that the stirring direction and the current churning direction are different), the current churning angle 105 is registered in such a way that the churning speed of the solution 1202 decreases considerably.

In the event that the stirring angle 102 is zero (in the event that the position touched in the immediately preceding frame period and the position touched in the current frame period are the same, or that there is a movement in a radial direction), the current churning angle 105 is registered in such a way that the churning speed of the solution 1202 decreases. With data in the event that it is determined that the churning of the solution 1202 is being carried out (the immediately preceding churning angle α is other than zero), but the stirring operation is not being carried out, the current churning angle 105 is registered in such a way that the churning speed of the solution 1202 decreases just slightly.

One example of a magic stone generation conditions table provided in the ROM 171 of the cartridge 17 is shown in FIG. 6. As shown in FIG. 6, a magic stone name 201 and a combination 202 are registered, correlated, in a magic stone generation conditions table 200. The magic stone name 201 is a name used for each magic stone 1208 in a game world. The combination 202 indicates a combination of the materials 1203 which are ingredients generating the magic stone 1208. In order to generate the magic stone 1208, it is necessary to dissolve one or more of the materials 1203 in the solution 1202.

Although there is a limit to a quantity of the materials 1203 which can be registered as the combination 202 for one kind of magic stone, it is conceivable that there is a case in which a quantity of the materials 1203 exceeding the limit is dissolved in the solution 1202. In this kind of case, the registration limit quantity of materials is selected at random from among the materials 1203 dissolved in the solution 1202, and the magic stone is generated using only the selected materials 1203.

The items such as the material 1203 and magic stone 1208 which the player character has obtained are registered in an obtained item table provided in the RAM 172 of the cartridge 17. The items which the player character obtains, and a quantity thereof, are registered, correlated, in the obtained item table. A material 1203 registered in the obtained item table is deleted from the obtained item table by being inserted in the pot 1201 by means of an operation by the player.

Of the materials 1203 which the player character has obtained, materials 1203 contained in the pot 1201 displayed on the magic stone generation screen of the second LCD 12 are registered in an in-pot materials table provided in the RAM 172 of the cartridge 17. One example of the in-pot materials table is shown in FIG. 7. As shown in FIG. 7, a kind 301, a position 302, and a selection flag 303 are registered, for each material 1203, in an in-pot materials table 300. In the in-pot materials table 300, records corresponding to the materials 1203 contained in the pot 1201 are generated, and a record corresponding to the material 1203 used in the generation of the magic stone is deleted.

The kind 301 indicates the kind of material 1203 by means of one of the colors red (R), green (G) or blue (B). The position 302, which indicates a position of the materials 1203 on the magic stone generation screen by means of coordinates of the pot coordinate system, is updated by the churning of the solution 1202. The selection flag 303 is a flag which is set for a material 1203 in a condition in which it has been dissolved in the solution 1202 at the magic stone generation time, although the magic stone 1208 has not yet been generated. The position 302 of the material 1203 dissolved in the solution 1202 is deleted from the in-pot materials table 300.

Hereafter, a description will be given of processes executed, in the RPG according to the embodiment, in order to execute the game in the game apparatus 1 shown in FIGS. 1 and 2. Processes for generating an image corresponding to a game implementation status for each one frame period, and displaying it on the first LCD 11 and the second LCD 12 are carried out by the CPU core 21, the first GPU 24 and the second GPU 26 but, as they are no different from what has heretofore been known, a detailed description will be omitted. A process described as a process which displays the image on the first LCD 11 and the second LCD 12 in the following description is one which is to be included in the image generated for each one frame. Apart from this too, it may be the case that a description of processes other than processes unique to the embodiment is omitted. Also, interim process information of the controller 103 (including information indicating contents to be displayed) is temporarily stored in the WRAM 22.

Figure 8:
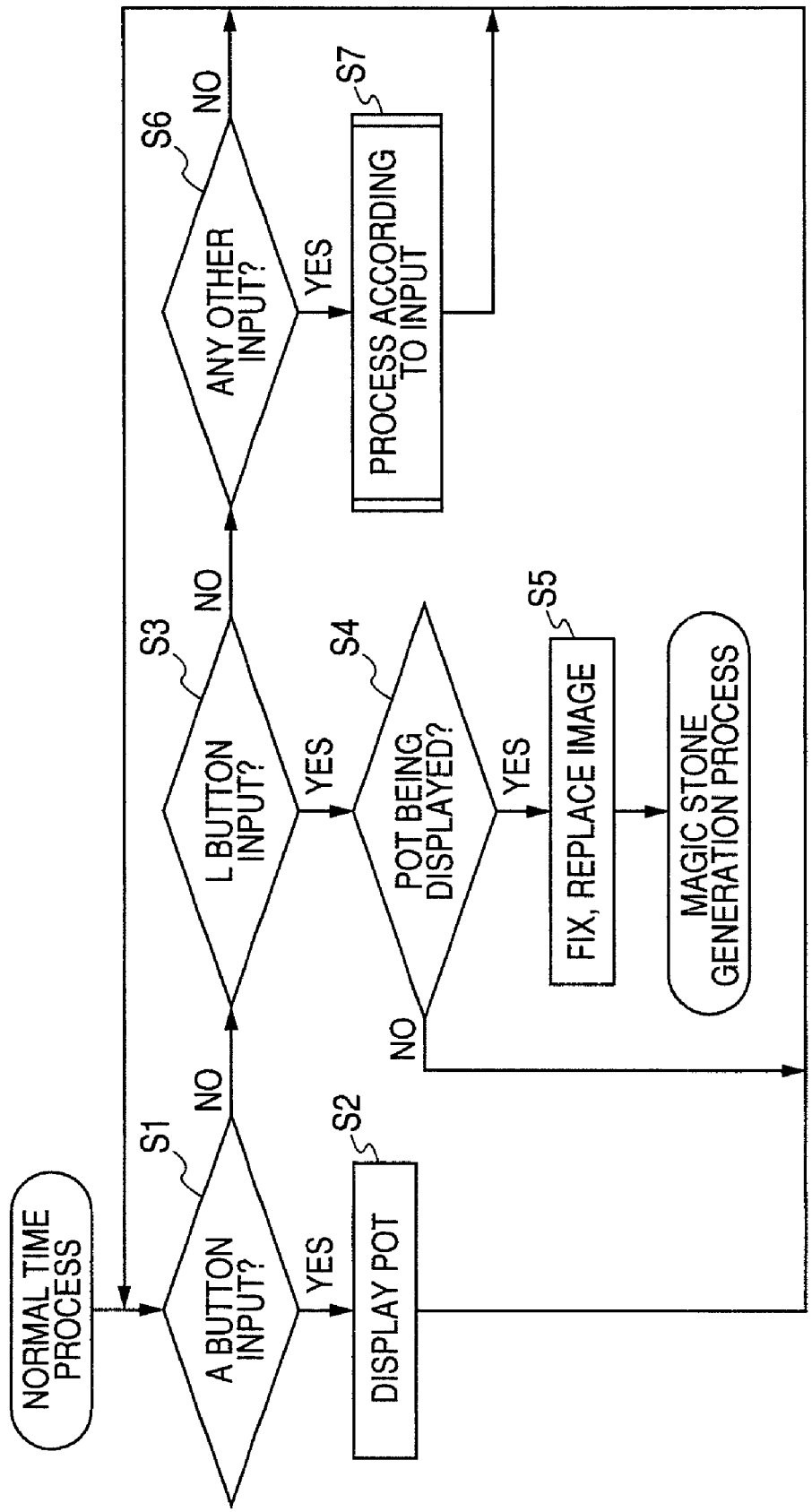
FIG. 8 is a flowchart showing processes carried out in each one frame period at a normal time, in the RPG according to the embodiment of the invention.

FIG. 8 is a flowchart showing processes carried out, in the RPG according to the embodiment, in each one frame period at the normal time. The processes of the flowchart are processes by which the CPU core 21 executes the game program loaded from the ROM 171 of the cartridge 17 into the WRAM 22.

In the normal time processes, the CPU core 21 determines whether or not an instruction to display the pot 1201 on the first LCD 11 has been received from the A button 14a (step S1) If the instruction has been received from the A button 14a, the CPU core 21 causes the pot 1201 to appear on the game screen being displayed on the first LCD 11 (step S2). Then, the CPU core 21 finishes the processes of the flowchart.

If the instruction has not been received from the A button 14a, the CPU core 21 determines whether or not there has been an input from the L button 14f (step S3). If there has been the input from the L button 14f, the CPU core 21 determines whether or not the pot 1201 is being displayed in the vicinity of the front of the player character on the game screen of the first LCD 11 (step S4). If the pot 1201 is not being displayed on the game screen of the first LCD 11, the CPU core 21 finishes the processes of the flowchart.

If the pot 1201 is being displayed in the vicinity of the front of the player character, the CPU core 21 instructs the first GPU 24 to fix the display of the first LCD 11 at an image currently being displayed on the first LCD 11, and instructs the second GPU 26 to replace the command selection screen being displayed on the second LCD 12 with the magic stone generation screen (step S5). Then, the CPU core 21 shifts to a magic stone generation process. Details of the magic stone generation process will be described hereafter.

If there has not been the input from the L button 14f, the CPU core 21 determines whether or not there has been another input from the operating switch portions 14 (other than the A button 14a and the R button 14g) or the touch sensitive panel 13 (step S6). If there has been the other input from the operating switch portions 14 (other than the A button 14a and the R button 14g) or the touch sensitive panel 13, the CPU core 21 carries out a process in accordance with the input (such as, for example, moving the player character, causing the player character to obtain a material 1203 or a magic stone 1208, or inserting the material 1203 in the pot 1201) (step S7). After that, the CPU core 21 finishes the processes of the flowchart. If there has not been the other input either, the CPU core 21 finishes the processes of the flowchart directly.

Figure 9:
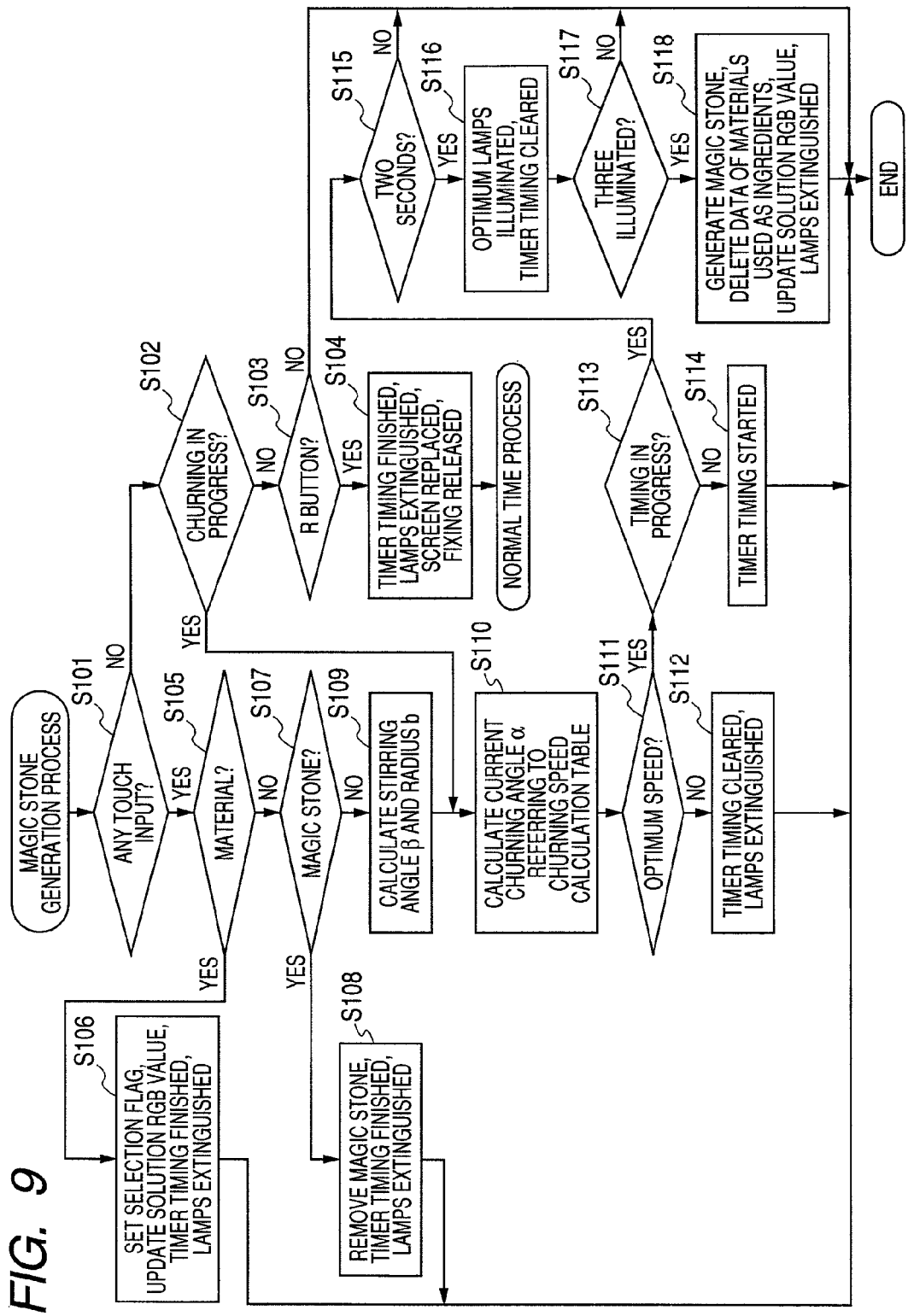
FIG. 9 is a flowchart showing processes carried out in each one frame period at the magic stone generation time, in the RPG according to the embodiment of the invention.

FIG. 9 is a flowchart showing processes carried out, in the RPG according to the embodiment, in each one frame period at the magic stone generation time. At the magic stone generation time, it is taken that the movement of the player character on the game screen displayed on the first LCD 11 is stopped. At the magic stone generation time, the magic stone generation screen, on which the materials 1203 registered in the in-pot materials table 300 are contained in the pot 1201, is displayed on the second LCD 12.

In the magic stone generation process, the CPU core 21 determines whether or not a touch input has been made via the touch sensitive panel 13 (step S101). If the touch input has not been made via the touch sensitive panel 13, the CPU core 21 determines whether or not the churning is currently being carried out, depending on whether or not the immediately preceding churning angle α calculated as the current churning angle α in the immediately preceding frame period is zero (step S102). If the churning is being carried out, the CPU core 21 proceeds to a process of step S110. If the churning is not being carried out, the CPU core 21 determines whether or not there has been an input from the R button 14g (step S103).

If there has been the input from the R button 14g, the CPU core 21, in the event that a timer is timing, finishes the timing of the timer and, in the event that there is an illuminated optimum lamp 1206, extinguishes it. Then, the CPU core 21 instructs the second GPU 26 to replace the magic stone generation screen being displayed on the second LCD 12 with the command selection screen, and instructs the first GPU 24 to release the fixing of the image being displayed on the first LCD 11 (step S104). Then, the CPU core 21 shifts to the heretofore described normal time processes. If there has not been the input from the R button 14g, the CPU core 21 finishes the processes of the flowchart directly.

If the touch input has been made via the touch sensitive panel 13, the CPU core 21 determines whether or not the material selection operation has been carried out, depending on whether a position at which the touch input has been made is a coordinate position in which the material 1203 is being displayed (step S105). If the material selection operation has been carried out, the CPU core 21 sets the selection flag 303 of the in-pot materials table 300 for the material 1203 for which the material selection operation has been carried out, and updates the RGB value of the solution 1202 in accordance with the material for which the selection flag 303 has been set. Then, the CPU core 21, in the event that the timer is timing, finishes the timing of the timer and, in the event that there is an illuminated optimum lamp 1206, extinguishes it. Herein, the image of the selected material 1203 dissolving in the solution 1202 is displayed on the magic stone generation screen, along with which the color of the solution 1202 changes (step S106). Then, the CPU core 21 finishes the processes of the flowchart.

If the material selection operation has not been carried out, the CPU core 21 determines whether or not the magic stone removal operation has been carried out, depending on whether the position at which the touch input has been made is a coordinate position in which the magic stone 1208 is being displayed (step S107). If the magic stone removal operation has been carried out, the CPU core 21 instructs the second GPU 26 to remove the magic stone 1208 being displayed on the second LCD 12. Then, the CPU core 21, in the event that the timer is timing, finishes the timing of the timer and, in the event that there is an illuminated optimum lamp 1206, extinguishes it. Herein, the image of the magic stone 1208 flying out of the pot 1201 (the display range of the second LCD 12), in a magic stone removal operation direction, is displayed on the magic stone generation screen (step S108). Then, the CPU core 21 finishes the processes of the flowchart.

If the magic stone removal operation has not been carried out, the CPU core 21 calculates the stirring angle β from a coordinate position touch input in the current frame period and a coordinate position touch input in the immediately preceding frame period. Also, the CPU core 21 calculates the current radius b from the coordinate position touch input in the current frame period (step S109). Then, the CPU core 21 proceeds to the process of step S110.

In step S110, the CPU core 21 decides the current churning angle α, referring to the churning speed calculation table 100, based on the immediately preceding churning angle α calculated as the current churning angle α in the immediately preceding frame period, the immediately preceding radius a calculated as the current radius b in the immediately preceding frame period, and the stirring angle β and current radius b calculated in step S109. Then, the CPU core 21 determines whether or not the current churning angle α is within the optimum speed range 1205 (step S111). If it is not within the optimum speed range 1205, the CPU core 21, in the event that the timer is timing, finishes the timing of the timer and, in the event that there is an illuminated optimum lamp 1206, extinguishes it (step S112). Then, the CPU core 21 finishes the processes of the flowchart.

If the current churning angle α is within the optimum speed range 1205, the CPU core 21 determines whether or not the timer is in the process of timing (step S113). If the timer is not timing, the CPU core 21 starts the timing of the timer (step S114). Then, the CPU core 21 finishes the processes of the flowchart.

If the timer is timing, the CPU core 21 determines whether or not two seconds have elapsed since the start of the timing (step S115). If two seconds have not yet elapsed since the start of the timing, the CPU core 21 finishes the processes of the flowchart directly. If two seconds have elapsed since the start of the timing, the CPU core 21 illuminates one of the optimum lamps 1206, and finishes the timing of the timer (step S116). Then, the CPU core 21 determines whether or not the three optimum lamps 1206 have been illuminated (step S117). If the three optimum lamps 1206 have not yet been illuminated, the CPU core 21 finishes the processes of the flowchart directly. In the event that there is no material 1203 for which the selection flag 303 has been set in the in-pot materials table 300, even though the three optimum lamps 1206 have been illuminated, the CPU core 21 finishes the processes of the flowchart directly.

If the three optimum lamps 1206 have been illuminated, the CPU core 21 compares a combination of all the materials for which the selection flag 303 has been set in the in-pot materials table 300 with the combinations 202 registered in the magic stone generation conditions table 200, decides a kind of the magic stone 1208 to be generated, and generates a magic stone 1208 of the kind decided. It not necessarily being the case that all the materials 1203 for which the selection flag 303 has been set in the in-pot materials table 300 are used as the ingredients of the magic stone 1208 at this point, it may also happen that materials selected at random, from among the materials 1203 for which the selection flag 303 has been set, are used in the generation of the magic stone.

The CPU core 21 deletes records of all the materials 1203 used as the ingredients for generating the magic stone 1208 from the in-pot materials table 300, and updates the RGB value of the solution 1202 in accordance with materials 1203 for which records still remain in the in-pot materials table 300. Then, the CPU core 21 extinguishes the three optimum lamps 1206. Herein, the magic stone 1208 being displayed in the center of the pot 1201 on the magic stone generation screen, the color of the solution 1202 changes in accordance with the remaining materials 1203 (step S118). Then, the CPU core 21 finishes the processes of the flowchart.

As heretofore described, in the RPG according to the embodiment, the magic stone 1208 which produces the predetermined advantages in the implementation of the game, by being used in applications such as the attack on the enemy character and the restoration of the parameter of the player character, is generated based on the materials 1203. In the event of generating the magic stone 1208 from the materials 1203, it is necessary to insert desired materials 1203 in the pot 1201 in which the solution 1202 is contained, and for the player to carry out, fairly continuously, the stirring operation, circularly touching the touch sensitive panel 13.

In this way, as the player causes the magic stone 1208 to be generated by carrying out the stirring operation, which is a circular operation similar to a case of actually stirring a liquid, unlike a case in which, by just a simple button operation, an item is subsequently automatically generated (including a case in which an item generation process is displayed as a series of images), it is possible for the player to appreciate that his or her own operation is involved in the generation of the magic stone 1208. What is more, as the operation is one which the player can carry out intuitively by a touching operation on the touch sensitive panel 13, it becomes increasingly easy to appreciate that the player him or herself is carrying out the generation of the magic stone 1208.

Herein, whether or not the magic stone 1208 is generated from the materials 1203 is decided depending not on what kind of aspect (the speed and direction) the player's stirring operation is being carried out at, but on what kind of aspect (the speed) the churning of the solution 1202, based on the stirring operation, is carried out at. The speed at which the solution 1202 is churned in each frame period is decided not only by the speed and angle of the stirring operation in the relevant frame period, but also decided by the speed of the churning in the immediately preceding frame period. That is, even though an aspect of the stirring operation in one frame period is the same, it is not necessarily the case that an aspect of the churning of the solution 1202 is the same.

As a result of this, in order to make the churning of the solution 1202 take place at a predetermined speed at which the magic stone 1208 is generated, as opposed to a case of simply making the speed of the stirring operation a predetermined speed, there arises a necessity of finely adjusting the speed of the stirring operation, meaning that, even though the player generates the magic stone 1208 any number of times in the game, it is not easy to get used to the stirring operation for causing the churning at the predetermined speed. Thanks to this, it is possible to prevent the player from becoming bored with the operation in the process of generating the magic stone 1208, and to prevent this kind of operation from seeming troublesome to the player.

Also, the current churning angle α, which indicates the speed and direction of the churning of the solution 1202 in each frame period, is determined, referring to the churning speed calculation table 100, in accordance with the immediately preceding churning angle α, which indicates the angular speed and direction of the churning in the immediately preceding frame period, the stirring angle β, which indicates the angular speed and direction of the stirring operation, and the current radius b and immediately preceding radius a, which are rotation radii of the stirring operation in the current frame period and the immediately preceding frame period. Although, to date, a complicated physical calculation has been necessary to find the aspect of the churning of the solution 1202, as it is achieved by a table look-up method, it does not happen that the process becomes complicated.

Naturally, in the event that the stirring operation has not been carried out (transposed to the actual churning, a churning implement has been removed from the solution), the current churning angle α registered in the churning speed calculation table 100 is slightly smaller than the immediately preceding churning angle α. Also, in the event that the direction of the stirring angle β due to the stirring operation is the same as the direction of the immediately preceding churning angle α, the current churning angle α has an absolute value larger than that of the immediately preceding churning angle α (that is, the speed of the churning increases). Contrarily, in the event that the direction of the stirring angle β is opposite to the direction of the immediately preceding churning angle α, the current churning angle α has an absolute value smaller than that of the immediately preceding churning angle α.

The churning of the solution 1202 carried out in this way by the player's stirring operation is expressed in a condition similar to that of a churning in a case of carrying out a stirring operation on a liquid in real life. For this reason, it does not happen that the player feels an anomaly between the stirring operation which he or she is carrying out, and the churning of the solution 1202 in the pot 1201 displayed on the second LCD 12.

Also, although the churning speed of the solution 1202 is a condition for generating the magic stone 1208, the churning speed of the solution 1202 is indicated by the churning speedometer 1204, and also, whether or not the churning speed is within the range of the predetermined speed is indicated here. For this reason, the player can easily judge whether or not the churning speed of the solution 1202 is appropriate, and also, even when the speed is not appropriate, can easily carry out an adjustment of a speed of his or her own stirring operation, using a change of the speed being displayed as a guideline.

Also, there being three kinds of the material 1203 for generating the magic stone 1208, the magic stone 1208 is generated in accordance with the kinds of the material 1203, among those which have been inserted into the pot 1201, which have dissolved in the solution 1202. That is, in the event that the kinds of the material 1203 which have dissolved in the solution 1202 differ, the kind of the magic stone 1208 generated also differs, but the color of the solution 1202 until the magic stone 1208 is generated also changes. Even in the event that the player forgets the kinds of the material 1203 which he or she has selected by means of the material selection operation, as it is possible to judge, to a certain extent, which kinds of the material 1203 have dissolved by means of the difference in the color of the solution 1202, it is also possible to predict, to a certain extent, the kind of the magic stone 1208 generated.

Also, the material selection operation by the player being necessary in order to dissolve the material 1203 for generating the magic stone 1208 in the solution 1202, it is possible to dissolve a plurality of the materials 1203 in the solution by carrying out the material selection operation several times. Then, the magic stone 1208 corresponding to the kinds of the material 1203 selected by the player and dissolved in the solution 1202 is generated. In this way, as the player can select the materials 1203 in a variety of patterns, and generate differing magic stones 1208, it is possible to arrange in such a way that the player does not become bored with the magic stone 1208 generation operation.

Furthermore, the player being able to obtain the materials 1203 for generating the magic stone 1208 is limited to only a certain case in the implementation of the game. For this reason, it not being the case that it is possible to generate the magic stone 1208 any number of times without limit, the number of times of carrying out the operation for generating the magic stone 1208 is also limited, meaning that it is possible to arrange in such a way that, as far as possible, the player does not become used to the operation for generating the magic stone 1208. Also, which kind of the magic stone 1208 should be generated using which kinds of the material 1203 has an effect on the implementation of the game, meaning that it is possible to realize a highly strategic gaming element.

The invention not being limited to the heretofore described embodiment, various modifications and applications are possible. Hereafter, a description will be given of modification aspects of the heretofore described embodiment which are applicable to the invention.

In the heretofore described embodiment, in the event that at least one of the materials 1203 is dissolved in the solution 1202, as long as the other conditions are appropriate, some kind of the magic stone 1208 is always generated. Naturally, it is also acceptable to arrange in such a way that, in order to generate the magic stone 1208, at least a predetermined plural number of the materials 1203 must be dissolved in the solution 1202. Also, it is also acceptable to arrange in such a way that, for example, although the same three materials 1203 are dissolved in the solution 1202, it is possible to generate a magic stone 1208 corresponding to a combination of red-red-red, but it is not possible to generate a magic stone 1208 corresponding to a combination of red-green-green.

In the heretofore described embodiment, the kind of the magic stone 1208 generated by the magic stone generation process is determined in accordance with the combination 202 of the kinds 401 of the materials 1203 selected by the material selection operation. Also, whether or not the magic stone 1208 is generated by the magic stone generation process is determined depending on whether or not the speed at which the churning is being carried out (the current churning angle α) is within the optimum speed range 1205 for six seconds. As opposed to this, it is also acceptable to arrange in such a way that the kind of the magic stone 1208 generated, and an existence or otherwise of the generation of the magic stone 1208, are determined by other conditions.

For example, it is also acceptable to arrange in such a way that the kind of the magic stone 1208 generated, and the existence or otherwise of the generation of the magic stone 1208, are determined depending on a time taken from the stirring operation being started until the three optimum lamps 1206 are illuminated. In this case, a limit being imposed on a time for raising the churning of the solution 1202 to an optimum speed, it is possible to increase a degree of difficulty of generating the magic stone 1208. Herein, a more intricate operation being required of the player in the stirring operation for the churning, it is possible not to allow the player to become easily used to a stirring operation which results in a desired magic stone being generated.

Also, for example, it is also acceptable to arrange in such a way that the kind of the magic stone 1208 generated, and the existence or otherwise of the generation of the magic stone 1208, are determined depending on the churning direction (the positivity or negativity of the current churning angle α) when the current churning angle α is within the optimum speed range 1205 for six seconds, or determined depending on the churning direction (the positivity or negativity of the current churning angle α) at an elapsing of a predetermined time from the stirring operation being started. In this case, when the player carries out the stirring operation, it being necessary to adjust the churning direction, it is possible not to allow the player to become easily used to the stirring operation which results in the desired magic stone being generated.

Also, for example, it is also acceptable to arrange in such a way that the kind of the magic stone 1208 generated, and the existence or otherwise of the generation of the magic stone 1208, are determined depending on the churning speed (the value of the current churning angle α) from the churning being started until a time at which the predetermined time elapses. It is also acceptable that the kind of the magic stone 1208 generated, and the existence or otherwise of the generation of the magic stone 1208, are determined depending on the churning speed at the point at which the predetermined time elapses.

Furthermore, for example, it is also acceptable to arrange in such a way that the kind of the magic stone 1208 generated, and the existence or otherwise of the generation of the magic stone 1208, are determined depending on the current churning angle α reaching a predetermined value, determined depending on a time taken until the current churning angle α reaches the predetermined value, determined depending on the positivity or negativity of the current churning angle α when it reaches the predetermined value, determined in accordance with the kinds 301 and the combinations 202 of the materials 1203 not selected by the material selection operation, determined in accordance with a selection order of the materials 1203 selected by the material selection operation, or determined by combining a plurality of these.

In the above kinds of case, it also being difficult for the player to get used to the operation necessary for generating the desired magic stone 1208, it is possible to prevent the player from becoming bored with the generation of the magic stone 1208 in the implementation process of the game. Naturally, even in the event of becoming an advanced player and getting used to the operation, as it is possible to increase options in the generation of the magic stone 1208 by adjusting the operation, it is possible to achieve an increase in the gaming element in this respect.

In the case in which the kind of the magic stone 1208 generated, and the existence or otherwise of the generation of the magic stone 1208, are determined in accordance with the kinds 301 and the combinations 202 of the materials 1203 not selected by the material selection operation, it is also acceptable to set a parameter of an ease of dissolving for each material 1203. In this case, depending on the speed at which the churning is being carried out, while there are materials 1203 which dissolve, there are also materials which do not dissolve. Herein, it is possible to arrange in such a way that the kind of the magic stone 1208 generated, and the existence or otherwise of the generation of the magic stone 1208, are determined depending on the combination 202 of the kinds 301 of the dissolved materials 1203. For example, it is possible to arrange in such a way that, when the current churning angle α is 1, no material dissolves, and no magic stone is generated, when the current churning angle α becomes 2, a material 1 dissolves, and a magic stone 1 is generated, when the current churning angle α becomes 3, a material 2 dissolves, and the magic stone 1 changes to a magic stone 2, and when the current churning angle α becomes 4, no material dissolves, and the magic stone disappears. Herein, by there being materials 1203 which dissolve easily and materials 1203 which do not dissolve easily, even though the player carries out the same stirring operation, results (the existence or otherwise of the generation of the magic stone 1208, and the kind of the magic stone 1208) differ, meaning that it is possible to prevent the player from becoming bored with the magic stone 1208 generation operation.

In the heretofore described embodiment, the optimum speed range 1205 is fixed at a constant. As opposed to this, it is also acceptable that the optimum speed range 1205, not needing to be always a constant, changes in accordance with a predetermined condition. For example, it is possible to arrange in such a way that the optimum speed range 1205 is determined in accordance with a level of the player. Also, it is also possible to arrange in such a way that the optimum speed range 1205 is determined in accordance with the kinds 301 and the combinations 202 of the materials 1203 selected by the material selection operation. Herein, a degree of difficulty of the player carrying out the stirring operation changes in accordance with the determined optimum speed range 1205, and it is possible to prevent the player from immediately becoming easily used to the operation for causing the churning in the optimum speed range 1205. Also, in this case, it is also possible to arrange in such a way that a color is displayed on the churning speedometer 1204, and that a color of the solution 1202 changed by the material selection operation is made a color of the optimum speed range 1205. Herein, the player, while visually judging the optimum speed, can carry out the stirring operation while adjusting in such a way that it is in a range of the same color as the color of the solution 1202.

In the heretofore described embodiment, the speed at which, and direction in which, the churning is carried out (the current churning angle α) are determined by referring to the churning speed calculation table 100. As opposed to this, it is also acceptable that the current churning angle α is determined or calculated by another predetermined method (for example, calculated by means of a predetermined expression).

Also, parameters for determining the current churning angle α are not limited to the immediately preceding churning angle α, the stirring angle, the immediately preceding radius a, and the current radius b.

For example, it is also acceptable to arrange in such a way that the current churning angle α is also affected by a quantity of the materials 1203 in the solution 1202. In this case, it is sufficient to set elemental parameters in such a way that the greater the quantity of the materials 1203 existing in the solution 1202, along with a resistance becoming greater, the speed at which the churning is carried out drops. Furthermore, in a case in which a size and mass differ for each material 1203, it is also possible to set the elemental parameters in such a way that, the larger (or the heavier) the material existing in the solution 1202, the slower the speed at which the churning is carried out.

Also, it is acceptable to arrange in such a way that, in a case in which it is possible to insert the material 1203 in the solution 1202 partway through the churning, the insertion of the material 1203 affects the current churning angle α. By setting this kind of parameter, it being possible to carry out a display closer to the churning of a solution in real life, it is even less likely that the player feels uncomfortable with the aspect of the churning displayed in response to the stirring operation. Also, as it is also necessary to adjust the stirring operation in accordance with the differences between these parameters, it is possible to further prevent the player from getting used to the operation for generating the magic stone 1208.

In the heretofore described embodiment, the speed at which the churning is being carried out is indicated by the bar 1207 on the churning speedometer 1204. As opposed to this, it is also acceptable that the speed at which the churning is being carried out is indicated by another method. For example, it is also acceptable that only the fact that the speed at which the churning is being carried out is within the optimum speed range 1205 is displayed. It is also acceptable not to indicate the speed at which the churning is being carried out at all (naturally, in this case, it is preferable to make the time for determining the optimum speed shorter than in the heretofore described embodiment (it is also acceptable that the optimum speed is reached for only one frame period)).

In the heretofore described embodiment, the solution 1202 is not being churned in the initial condition immediately after the magic stone generation screen is displayed on the second LCD 12. As opposed to this, it is also acceptable to arrange in such a way that the solution 1202 is being churned in the initial condition immediately after the magic stone generation screen is displayed on the second LCD 12. In this case, it is also acceptable to arrange in such a way that the speed at which, and direction in which, the churning of the initial condition is being carried out are determined at random by the CPU core 21, or determined in accordance with the implementation condition of the game. Also, it is also acceptable to arrange in such a way that, in a case in which the player's stirring operation has not been carried out by the time the churning being carried out in the initial condition stops, the magic stone 1208 is not generated. In this case, a degree of difficulty of bringing the speed at which the churning is being carried out by the stirring operation within the optimum speed range 1205 further increasing, in accordance with the churning in the initial condition immediately after the magic stone generation screen is displayed on the second LCD 12, it is possible not to allow the player to become easily used to a stirring operation for attaining the optimum speed.

In the heretofore described embodiment, there is one kind of the pot 1201. As opposed to this, it is also acceptable to arrange in such a way that there is a plurality of kinds of the pot 1201. In this case, it is possible to arrange in such a way that the solution 1202 contained inside varies in accordance with each kind of the pot 1201. Herein, a parameter other than the RGB value is set for the solution 1202. For example, in a case in which a parameter indicating viscosity is set for the solution 1202, it is possible to arrange in such a way that the more the plurality of the materials 1203 are dissolved, the higher the viscosity of the solution 1202 becomes. Also, it is also acceptable that parameters indicating a volume, a temperature or the like of the solution 1202 are set. Furthermore, it is also acceptable to arrange in such a way that the parameters set for the solution 1202 change in accordance with the churning (the speed and the direction).

In the heretofore described embodiment, the circular pot 1201 of the predetermined size, of which the center point 1200 is positioned in the approximate center of the screen, is displayed on the magic stone generation screen. As opposed to this, the display position, display size and shape of the pot 1201 are not limited to these. It is acceptable that the display position and display size of the pot 1201 are either changed in accordance with predetermined conditions, or changed in accordance with the player's operations. Also, in the event that there is the plurality of kinds of the pot 1201, it is possible to arrange in such a way that the shape varies depending on the kind of the pot 1201.

In the heretofore described embodiment, the movement of the player character on the game screen displayed on the first LCD 11 stops at a display time of the magic stone generation image. In the event that an action RPG is applied as the RPG, it is acceptable to arrange in such a way that, at the display time of the magic stone generation image, the movement of the player character on the game screen displayed on the first LCD 11 is stopped, but a movement of the enemy character is not stopped. In this case, the enemy character also approaching the player and carrying out an attack while the generation of the magic stone is being carried out, in order to avoid the attack from the enemy character at the magic stone generation time, it is necessary to carry out the material selection operation, the stirring operation and the magic stone removal operation before the enemy character approaches. By this means, a temporal restriction arising, essentially, on a series of operations (the material selection operation, the stirring operation and the magic stone removal operation) until the magic stone is generated, the gaming element increases.

In the heretofore described embodiment, the game apparatus 1 includes the two display devices of the first LCD 11 and the second LCD 12. As opposed to this, it is also acceptable that there is one display device. In the event that the touch sensitive panel is used as a device for inputting the coordinate positions, it is possible to arrange in such a way that the touch sensitive panel is disposed on a front surface of the one display device. Also, in the event that there is only one display device, it is possible to arrange in such a way that it is possible to cause an image to appear on, and disappear from, the magic stone generation screen by means of predetermined operations by the player.

Although, in the heretofore described embodiment, the invention is applied to generating the magic stone 1208, by means of the churning, in the RPG, as long as a predetermined kind of item is used in the process of implementing the game, and it is generated using predetermined materials, it is also possible to apply the invention to other kinds of game, such as an adventure game, an action game, or a shooting game.

In the heretofore described embodiment, the inputting of the stirring operation is carried out by causing a circular movement operation on the touch sensitive panel 13 installed on a front surface of the second LCD 12. Naturally, it is also acceptable that a device for inputting the stirring operation, not being limited to the touch sensitive panel 13, is one which uses another pointing device, such as a mouse which carries out a coordinate inputting by means of a position of a cursor displayed on a display device. In the event of using a control pad with a built-in multiaxial acceleration sensor, it is also acceptable to place the control pad itself in a space, and rotate it.

In the heretofore described embodiment, a description is given, as an example, of the case of executing the RPG to which the invention is applied in the game apparatus 1, which includes the two display devices of the first LCD 11 and the second LCD 12, and the pointing device of the touch sensitive panel 13. However, as long as it includes at least a display device which displays an image of a game, and an input device with which it is possible to input a circular movement operation, it is also acceptable that it executes a game to which the invention is applied in a computer apparatus other than the game apparatus 1. It being acceptable that the computer apparatus which executes the game to which the invention is applied is either a game dedicated device or a general purpose device such as a personal computer, whether it is a portable type or a fixed type is irrelevant.

In the heretofore described embodiment, the program and data of the game apparatus 1 are distributed stored in the ROM 171 of the game cartridge 17. Naturally, the recording medium which stores the program and data not being limited to this kind of article, it is also possible to apply an optical and/or magnetic disc device (such as a flexible disc, a CD-ROM, or a DVD-ROM), in accordance with an aspect of a computer apparatus which forms a platform. In the event of having as the platform a computer apparatus including a fixed disc device, it is also acceptable that the program and data are distributed stored in advance in the fixed disc device.

Furthermore, in the event of applying, as the platform, a computer apparatus capable of communication with another computer apparatus via a network, it is also acceptable to store the program and data in a fixed disc device included in a server apparatus which exists on the network, and distribute them via the network.

What is claimed is:

1. A game apparatus which executes a game which uses a game element that causes a predetermined effect in the game during progress, comprising:
   a container display that displays an image of a container in which elemental materials that generate the game element are contained together with one of a liquid and a semi-liquid substance, the container being larger than the elemental materials;
   a churning operation inputter that inputs, in accordance with a player's operation, a churning operation that churns the substance and the elemental materials contained in the container;
   a churning display controller that determines a new aspect of the churning of the substance and the elemental materials in the container displayed on the container display in accordance with an aspect of the churning of the substance and the elemental materials until a present moment, and the churning operation input from the churning operation inputter, and displays the churning in a determined aspect; and
   a game element generator that generates the game element, that is distinct from the elemental materials, based on the churned elemental materials in accordance with the aspect of the churning of the substance and the elemental materials being displayed churning by the churning display controller.

2. The game apparatus according to claim 1, wherein
   the churning display controller continues to display the churning, while gradually reducing a speed at which the substance and the elemental materials are churned in accordance with the aspect of the churning displayed up to the present moment in the event that the input of the churning operation from the churning operation inputter is terminated after the substance and the elemental materials are displayed churning in the container.

3. The game apparatus according to claim 2, wherein
   the churning operation inputter is able to input a condition in which the churning operation is stopped while the substance and the elemental materials are still in the container, in addition to terminating the input of the churning operation in the container,
   in the event that the condition in which the churning operation is stopped while the substance and the elemental materials are still in the container has been input by the churning operation inputter, the churning display controller reduces the speed at which the substance and the elemental materials are churned further than in the case in which the input of the churning operation in the container is terminated.

4. The game apparatus according to claim 2, wherein
   in the event that, after the substance and the elemental materials are displayed being churned in the container, a churning operation in a direction opposite to a direction of the churning is newly input from the churning operation inputter, the churning display controller causes the substance and the elemental materials to be displayed churning in the direction of the churning operation newly input from the churning operation inputter after continuing the display of the churning in the same direction until the churning is stopped while reducing the speed at which the substance and the elemental materials are churned further than in the case in which the input of the churning operation in the container is terminated.

5. The game apparatus according to claim 1, wherein
   an optional quantity of at least one of the elemental materials is contained in the container,
   even in the event that the churning operation input from the churning operation inputter is the same, the larger the quantity of the elemental materials contained in the container, the slower the speed at which the churning display controller causes the substance and the elemental materials to be displayed churning.

6. The game apparatus according to claim 1, wherein
   the churning display controller causes the substance and the elemental materials to be displayed churning in the container displayed on the container display, in a predetermined initial aspect which is not in a stopped condition, before there is the input of the churning operation from the churning operation inputter, and
   the game element generator generates the game element under a condition that the churning of the substance and the elemental materials is not stopped from the predetermined initial aspect,
   the game apparatus further comprising:
   an initial aspect changer that causes the predetermined initial aspect to change every time an opportunity to generate the game element arises.

7. The game apparatus according to claim 1, wherein
   the game element generator generates the game element under a condition that the churning of the substance and the elemental materials being displayed churning by the churning display controller continues for a certain time within a predetermined speed range.

8. The game apparatus according to claim 7, further comprising:
   a churning speed display that displays whether the churning of the substance and the elemental materials being displayed churning by the churning display controller continues for the certain time within the predetermined speed range.

9. The game apparatus according to claim 8, wherein
   the churning speed display displays an actual speed of the churning of the substance and the elemental materials being displayed churning by the churning display controller.

10. The game apparatus according to claim 7, wherein
    the game element generator generates the game element in accordance with a direction of the churning until the churning of the substance and the elemental materials being displayed churning by the churning display controller continues for the certain time within the predetermined speed range.

11. The game apparatus according to claim 7, further comprising:
    a speed range changer that changes the predetermined speed range.

12. The game apparatus according to claim 1, wherein
the game element generator generates the game element in accordance with a speed of the churning of the substance and the elemental materials being displayed churning by the churning display controller from the inputting of the churning operation by means of the churning operation inputter being started until a predetermined time elapses.

13. The game apparatus according to claim 1, wherein
the game element generator generates the game element in accordance with a direction of the churning of the substance and the elemental materials being displayed churning by the churning display controller from the inputting of the churning operation by the churning operation inputter being started until a predetermined time elapses.

14. The game apparatus according to claim 1, wherein
a plurality of kinds of the elemental materials are provided, and a plurality thereof are contained in the container, and
the game element generator generates the game element in accordance with a kind of at least one elemental material selected from among the plurality of elemental materials contained in the container.

15. The game apparatus according to claim 1, wherein
even though the elemental materials are contained in the container, there being those in a condition in which they are dissolved in the substance, and those in a condition in which they are not dissolved,
the game element generator generates the game element based on the elemental materials, among the elemental materials contained in the container, in the condition in which they are dissolved in the substance.

16. The game apparatus according to claim 15, wherein
there being the plurality of kinds of the elemental material,
the container display displays the substance inside the container in varying display aspects, in accordance with kinds of the elemental materials contained in the container in the condition in which they are dissolved in the substance, and
the game element generator generates the game element in accordance with the kinds of elemental materials_contained in the container in the condition in which they are dissolved in the substance.

17. The game apparatus according to claim 1, wherein
the churning operation inputter, being configured of a touch sensitive panel disposed on a front surface of the container display which transmissively indicates an image displayed on a relevant game image display, inputs the churning operation by tracing a position on the touch sensitive panel which corresponds to an inside of the container displayed by the container display.

18. The game apparatus according to claim 1, wherein
the churning operation inputter, being configured of a control pad including a multiaxial acceleration sensor, inputs the churning operation by causing a circular operation of the control pad.

19. The game apparatus according to claim 1, further comprising:
an elemental material obtainer that allows a player to obtain the elemental materials when predetermined events occur in the game, wherein
the elemental materials obtained by the elemental material obtainer are displayed being, contained in the container on the container display in accordance with an instruction from the player.

20. A game element generation method, executed in a computer apparatus including a memory device that stores information, a display device that displays an image, and an inputting device capable of inputting by a circular operation, which method generates a game element that causes a predetermined effect used in a game, comprising:
displaying an image of a container in a condition in which elemental materials for generating the game element are contained together with one of a liquid and a semi-liquid substance, the container being larger than the elemental materials;
inputting, by the inputting device subjected to the circular operation, a churning operation for churning the substance and the elemental materials contained in the container;
determining a new aspect of the churning of the substance and the elemental materials in the container displayed on the display device in accordance with an aspect of the churning of the substance and the elemental materials displayed on the display device until a present moment and the churning operation input by the circular operation of the inputting device, and temporarily storing the new status in the memory device;
displaying, on the display device, an image of the substance and the elemental materials churned in the container in the aspect temporarily stored in the memory device; and
generating the game element, that is distinct from the elemental materials, based on the churned elemental materials in accordance with the aspect of the churning of the substance and the elemental materials being displayed on the display device, and storing the generated game element in the memory device.

21. A tangible computer readable medium embodying a program of a game which is executed in a computer apparatus including a memory device which stores information, a display device which displays an image, and an inputting device capable of inputting by a circular operation, the game using a game element which causes a predetermined effect in the game during progress, the program causing the computer apparatus to execute:
displaying an image of a container in a condition in which elemental materials for generating the game element are contained together with one of a liquid and a semi-liquid substance, the container being larger than the elemental materials;
inputting, by the circular operation of the inputting device, a churning operation for churning the substance and the elemental materials contained in the container;
determining a new aspect of the churning of the substance and the elemental materials in the container displayed on the display device in accordance with an aspect of the churning of the substance and the elemental materials displayed on the display device until a present moment and the churning operation input by the circular operation of the inputting device, and temporarily storing the new aspect in the memory device;
displaying, on the display device, an image of the substance and the elemental materials churned in the container in the aspect temporarily stored in the memory device; and
in accordance with the aspect of the churning of the substance and the elemental materials being displayed on the display device, generating the game element, that is distinct from the elemental materials, based on the churned elemental materials, and storing the generated game element in the memory device.

* * * * *